Figures 1, 2, 3:
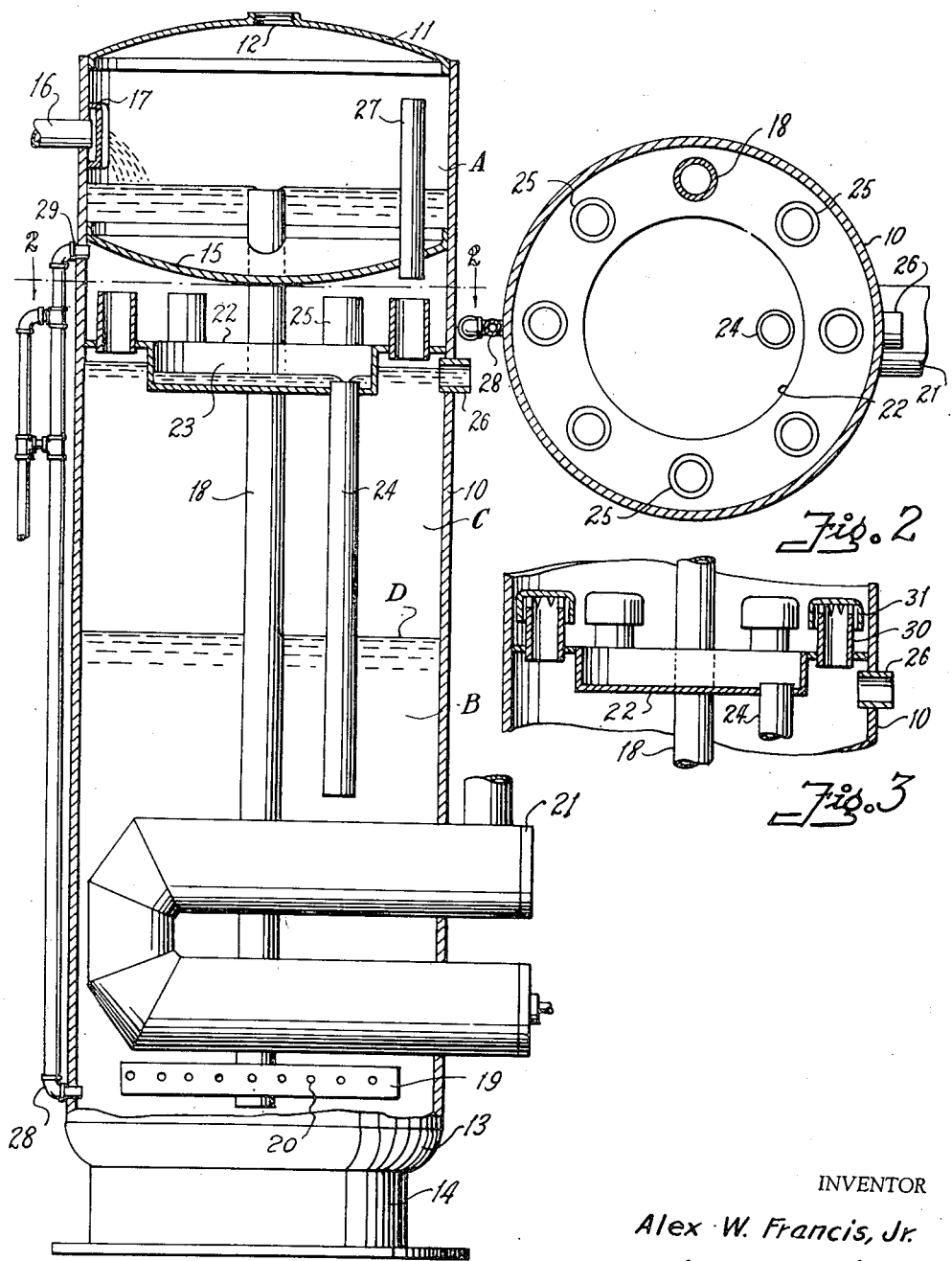

Oct. 9, 1956

A. W. FRANCIS, JR 2,765,917

EMULSION TREATERS

Filed Aug. 6, 1953

5 Sheets-Sheet 1

INVENTOR
Alex W. Francis, Jr.

BY Ashley & Ashley

ATTORNEYS

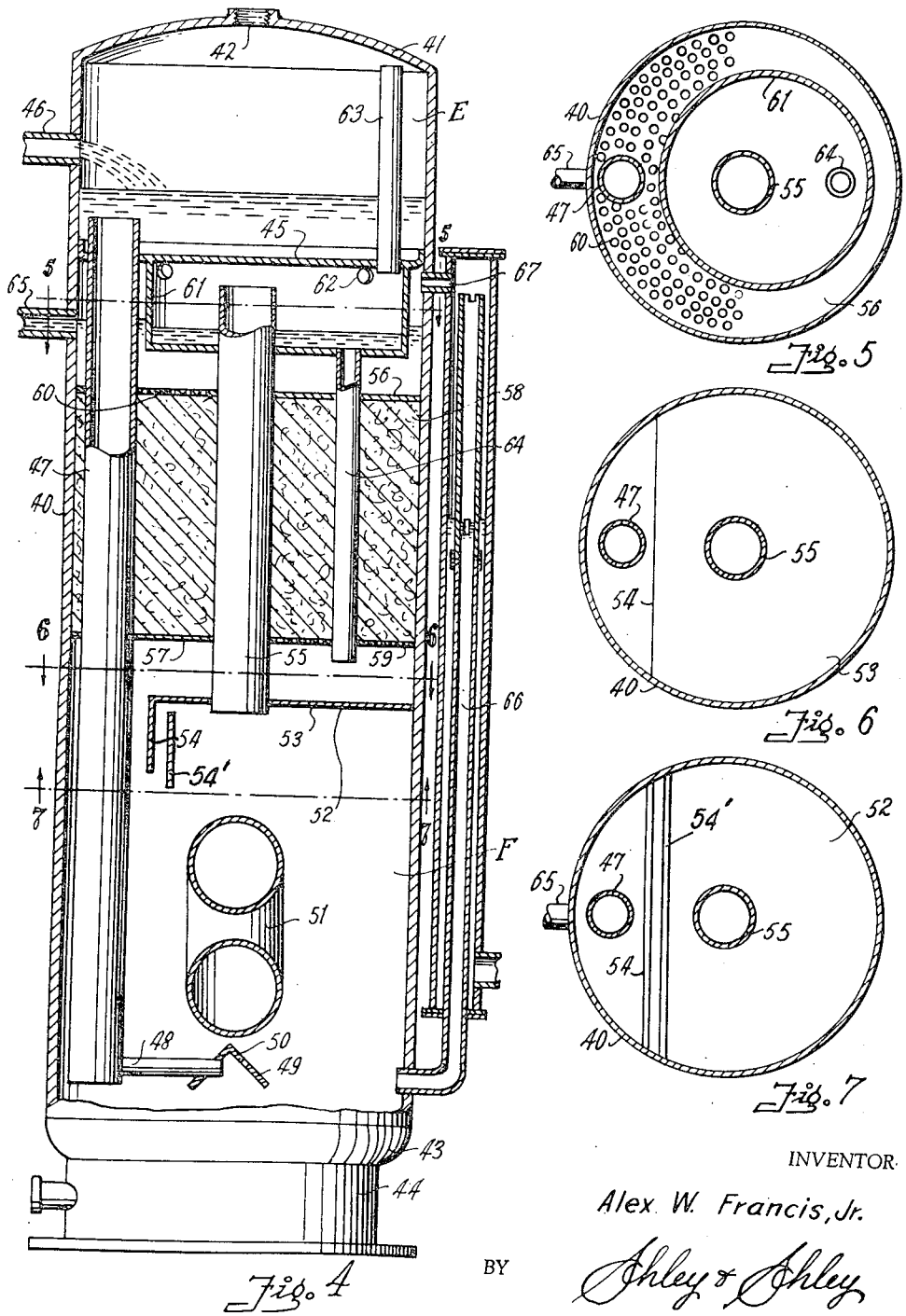

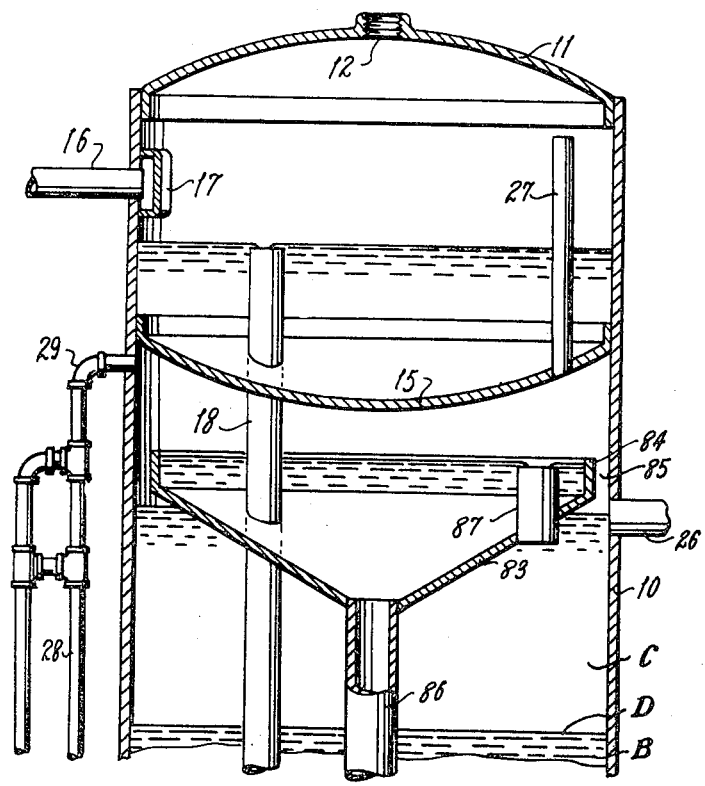
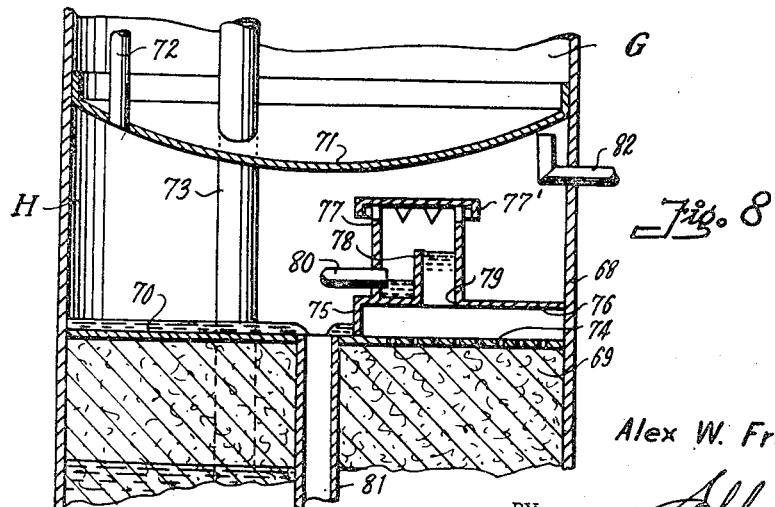

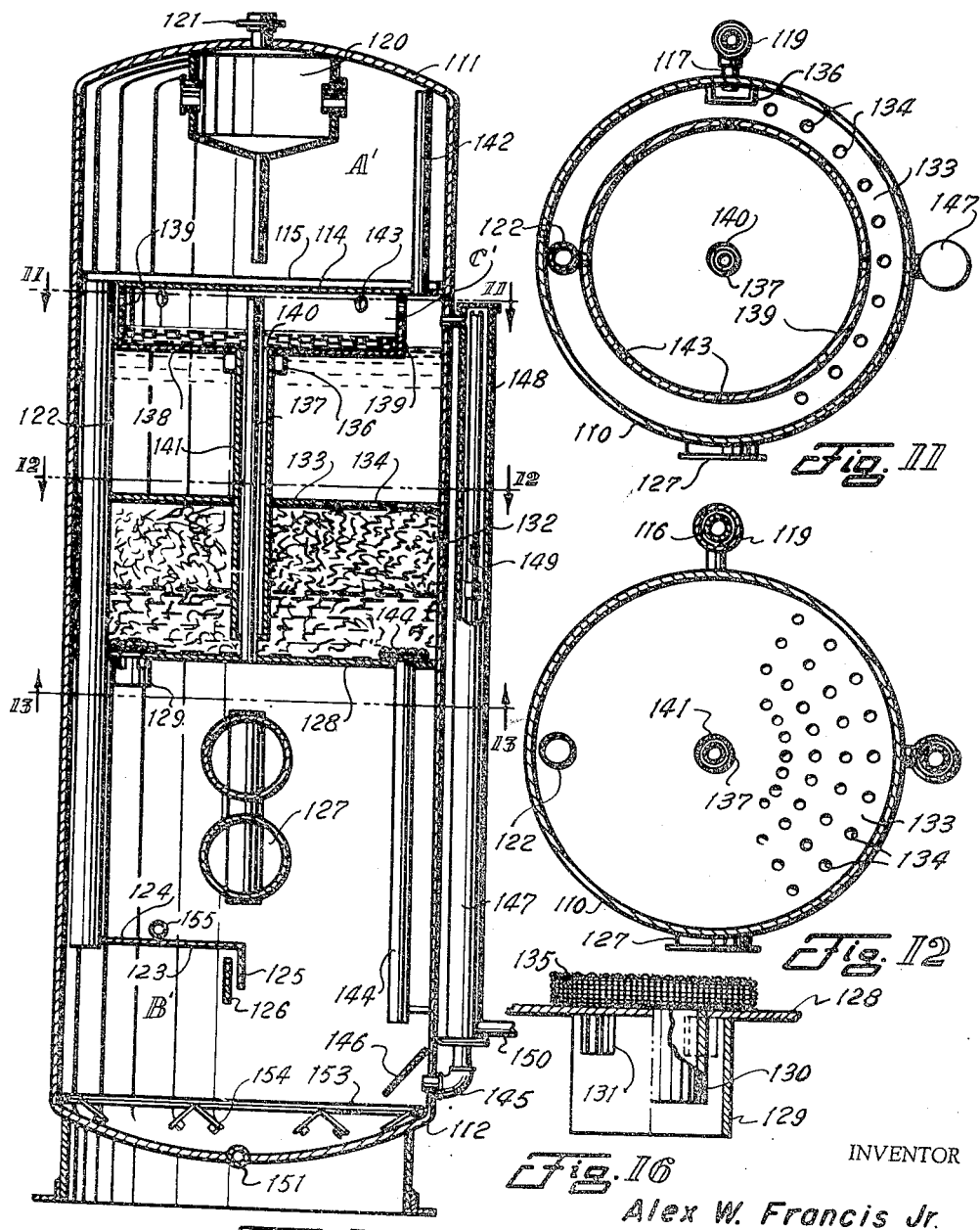

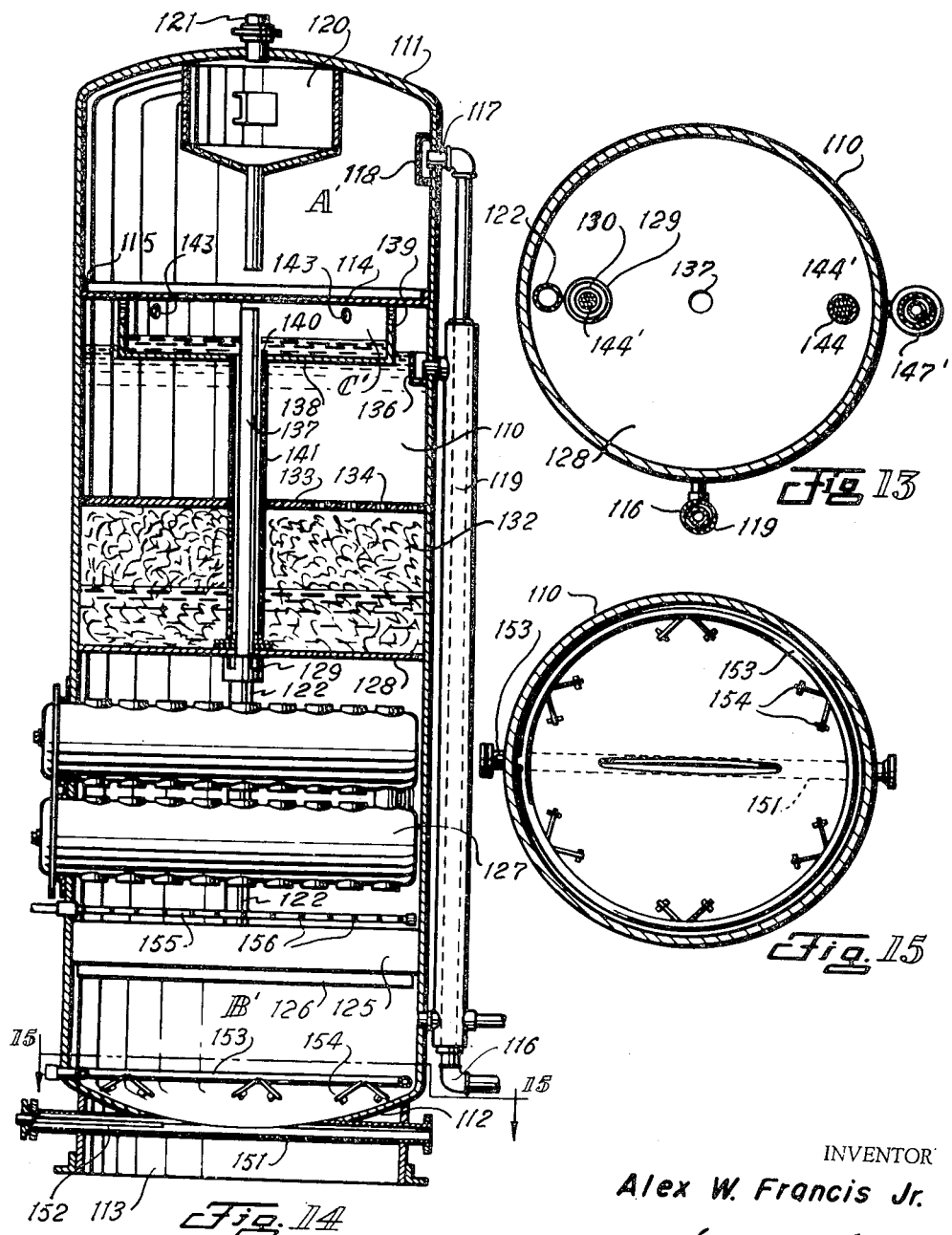

United States Patent Office 2,765,917
Patented Oct. 9, 1956

2,765,917

EMULSION TREATERS

Alex W. Francis, Jr., Tulsa, Okla., assignor to National Tank Company, Tulsa, Okla., a corporation of Nevada Continuation of abandoned applications Serial No. 28,903, May 24, 1948, and Serial No. 73,797, January 31, 1949. This application August 6, 1953, Serial No. 372,658

21 Claims. (Cl. 210—47)

This invention relates to new and useful improvements in emulsion treaters.

In emulsion treaters, an emulsion stream is treated, and usually washed, to break the emulsion and cause it to separate and stratify into its various components. Almost invariably, some heating of the emulsion stream is necessary to achieve this treating action, and in the course of the heating, some vaporization of hydrocarbons and of the water contained in the emulsion occurs. The vapors thus evolved course upwardly through the body of stratifying oil and water, and come into contact with the treater tank partition which overlies said body. The partition may be the upper end of the tank, but more often is the bottom of a preliminary treatment chamber situated at the upper end of the treater tank.

In any event, more or less condensation of the vaporized components takes place on the underside of the partition, and this is desirable in so far as the hydrocarbons are concerned since they are thus recovered and returned to the clean oil stratum. However, this result is not desirable with regard to the vaporized water because the latter is condensed and also returned to the upper portion of the clean oil layer from which the effluent clean oil is being drawn. In this manner, 1% or 2% or more water may be introduced into the clean oil produced and from which every effort has just been made to remove all water. Although the treater may be operating perfectly and removing substantially all of the water from the clean oil, this condensation of water vapor often reintroduces water into said oil so that the overall treating efficiency is impaired. Obviously, the problem is considerably magnified when heavier or more difficult emulsions are being treated and higher treating temperatures must be used. Their increased heating results in increased vaporization of water with the consequent increase in water content of the oil produced.

Modifications of the invention are particularly adapted for the treating of emulsified petroleum streams which are especially difficult to break or separate so that relatively high treating temperatures are required or desirable. The invention is also particularly adapted to the treatment of emulsified oil containing relatively high percentages of entrained or suspended sand or other similar foreign matter.

Heretofore, methods and apparatuses have been devised for permitting sand and other suspended solids to settle out of oil or emulsion streams. However, these devices were objectionable in that considerable quantities of immobile equipment were required and the settling process involved an extensive waiting period. The present invention treats emulsion streams at a relatively rapid rate and efficiently separates and settles sand and other foreign matter from the streams at an equally rapid rate whereby the treating capacity of the equipment is maintained at a high level and excessive equipment and/or expended time is eliminated.

The invention also makes provision for utilizing relatively high treating temperatures to separate and stratify the more difficult emulsion without incurring the undesirable features characteristic of such increased treating temperatures such as high loss by vaporization and contamination of the cleaned oil by condensed water vapor.

Therefore, an important object of the invention is to provide an improved emulsion treater in which provision is made for the prevention of contamination by condensed water of the clean oil produced.

A particular object of the invention is to provide an improved emulsion treater having means for condensing and recovering vaporized emulsion components and for removing condensed water from the condensed hydrocarbons before the latter are reintroduced into the clean oil effluent stream.

Yet another object of the invention is to provide an improved emulsion treating method wherein vaporized hydrocarbons, along with vaporized water, are condensed and recovered, and wherein the condensed water is separated from the condensed hydrocarbons prior to combining of the latter with the clean oil recovered.

A still further object of the invention is to provide an improved emulsion treating method wherein hydrocarbon and water vapors are gathered at the heating zone and conducted to a condensing zone wherein a major portion of the vapors are liquefied and then further processed to separate the condensed water from the condensed hydrocarbons, the latter being combined with the clean oil produced by this method so as to increase the gravity of said clean oil.

Yet another object of the invention is to provide an improved emulsion treater of the character described having means for preventing the return of condensed vapors directly to the clean oil layer.

A further object of the invention is to provide an improved emulsion treater of the character described wherein the condensed hydrocarbons are returned directly to the clean oil stratum apart from the condensed water.

Another object of the invention is to provide for efficient and effective preheating of the emulsion stream prior to its introduction into the heating chamber, a portion of such preheating taking place near the lower portion of the treater tank whereby sand and other foreign matter is given an ample opportunity to settle out of the emulsion stream, such settling being encouraged and enhanced by the preheating which reduces the viscosity of both the water and oil components of the emulsion stream.

A further object of the invention is to provide a thermosiphonic flow of the emulsion stream and the heating water in the heating chamber, such flow tending to increase the time required for the emulsion stream to flow through the heating chamber whereby more efficient heating is obtained and additional sand-settling time is provided.

A further object of the invention is to provide an improved emulsion treating method where free water is settled out of the emulsion stream at a plurality of points or steps in said method whereby the ultimate load upon the heating chamber of the treater is reduced so that more efficient treating of the tighter portions of the emulsion stream is effected and the necessary fuel consumption of the treater is reduced.

An important object of the invention is to provide an improved emulsion treater having a collecting and holding zone immediately above the heating element, said zone acting to trap the fluid flowing upwardly from said heater and to separate partially said fluids into their respective components whereby the lighter and cleaner fluids are permitted to flow upwardly to a stratifying and separating zone while the heavier fluids are retarded in such upward progress.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a vertical view in elevation showing an emulsion treater constructed for carrying out this invention, Fig. 2 is a horizontal, cross-sectional view taken on the line 2—2 of Fig. 1, Fig. 3 is a fragmentary, vertical view in elevation of a modified form of the collector tray, Fig. 4 is a vertical view in elevation of a second type of emulsion treater for carrying out a modification of this invention, Fig. 5 is a horizontal, cross-sectional view taken on the line 5—5 of Fig. 4, Fig. 6 is a horizontal, cross-sectional view taken on the line 6—6 of Fig. 4, Fig. 7 is a horizontal, cross-sectional view taken on the line 7—7 of Fig. 4, Fig. 8 is a fragmentary, vertical, sectional view of a modified treater structure for carrying out this method, Fig. 9 is a fragmentary, vertical, sectional view of the upper portion of a treater illustrating a further modification for carrying out this method, Fig. 10 is a vertical, sectional view of an emulsion treater constructed in accordance with a further modification of this invention and adapted to carry out this method, Figs. 11, 12 and 13 are horizontal, cross-sectional views taken upon the respective lines of Fig. 10, Fig. 14 is a view similar to Fig. 10 and taken at right angles thereto, Fig. 15 is a horizontal, cross-sectional view taken on the line 15—15 of Fig. 14, and Fig. 16 is an enlarged view, partly in elevation and partly in section, of the skimming structure forming the inlet to the filter section.

This application is a continuation of my co-pending applications, Serial No. 28,903, filed May 24, 1948, and Serial No. 73,797, filed January 31, 1949, both now abandoned.

In the drawings, the numeral 10 designates an elongate upright tank such as is ordinarily used for the purpose of treating petroleum emulsion streams. The tank has the usual domed top 11 carrying a gas outlet 12, and a dished bottom 13 carried upon the usual support 14. A downwardly concave head 15 extends transversely of the interior of the tank near its upper end so as to form a preliminary separation chamber A in the upper portion of the tank.

The emulsion stream enters the preliminary separation chamber A through an inlet pipe 16 which extends through the side wall of the tank 10 near the upper end thereof. A suitable baffle or diverter 17 is provided upon the inner wall of the chamber A in alinement with the pipe 16 so as to cause the incoming emulsion stream to be directed in a circuitous path around the wall of the preliminary separation chamber and thereby permit portions of entrained gas to escape while the liquid settles to the lower portion of the chamber upon the head 15.

A relatively quiet body of fluid is thus established in the chamber A, and a certain degree of preliminary separation or stratification of water from the hydrocarbon components of the emulsion stream is caused to take place in the chamber. Normally, considerable quantities of the "looser" portions of the emulsion stream are partially separated and stratified in this chamber.

Upon reaching a predetermined level, the fluids overflow into an upright pipe or flume 18 which extends vertically within the tank 10 from a point spaced a short distance above the head 15, downwardly through the head, to a point near the bottom 13. Due to this upper projection of the flume 18 within the chamber A, a certain minimum level, and thereby a body of liquid, is maintained in said chamber at all times. The overflowing fluids pass downwardly through the flume 18 to the bottom of the tank 10, at which point they are conducted from the flume to a suitable spreader member 19. The member 19 may be formed in any desirable fashion, but ordinarily consists of a length of angular plate in the form of an inverted V and carrying a plurality of perforations 20 along its length. The fluids passing downwardly through the flume 18 are directed into the apex of the spreader and thence passed upwardly through the plurality of openings 20. A U-shaped heater tube 21 extends through one side wall of the tank 10 so as to project diametrically across the interior of said tank. The heater or fire tube is positioned directly above the spreader unit 19, and may be of any desirable or suitable type. The form illustrated in the drawings is of the simple, gas-fired type, but it is to be noted that any suitable type of heater may be employed.

Normally, the lower portion or heater section B of the treater tank 10 is filled with warm or hot water, usually salt water, and the emulsion fluid, being lighter than water, will assume an upward course through the body of the salt water upon being released thereinto through the openings 20. In the course of their upward passage, the emulsion fluids are thoroughly heated by contact with the heater tube 21 and by passage through the hot or heated body of salt water present in the lower portion of the tank, it, of course, being understood that the heat of the body of salt water is also maintained by means of the heater tube 21. The heating of the emulsion stream and its washing in the body of salt water, effect a breaking of the emulsion so that the components thereof may settle or stratify into separate layers. The water from the emulsion settles into the lower portion of the tank, while the clean oil rises to the upper end thereof for withdrawal.

However, substantially all emulsion streams contain greater or lesser percentages of relatively light or volatile hydrocarbons which are easily vaporized, and in contacting the heater tube 21 and the body of hot salt water, such components are quite often vaporized and ultimately lost by being carried off through the gas outlet 12. It has been found that the provision of the dished or concave head 15 at the upper end of the heating chamber minimizes this loss of light and valuable hydrocarbons. Since the head 15 is always covered by a body of relatively cool fluid, namely the incoming emulsion stream, it serves as a cooling surface upon which the vaporized hydrocarbons are condensed, and from which they eventually fall back into the recovered body of fluids. Such an arrangement makes adequate provision for recovering the vaporized hydrocarbons and returning them to the clean oil being produced so as to conserve the light hydrocarbons and at the same time increase the gravity of said clean oil. Nevertheless, a considerable problem arises in such a process in that water is also introduced into the clean oil at the same time. The emulsion stream contacting the heater tube 21 contains considerable quantities of water, and in the course of absorbing heat so that the light hydrocarbons are unintentionally vaporized, a portion of such water content will also be vaporized. The water vapors pass upwardly with the hydrocarbon vapors and are condensed upon the underside of the head 15 in the same manner as said hydrocarbons, whereby the condensed water is permitted to drop into the clean oil along with the hydrocarbons. Obviously, such a result is not desirable, but heretofore it has been unavoidable. Of course, when it is necessary to increase the best input to the treater or use higher temperatures to break more difficult emulsions, this problem is magnified to a considerable degree.

In the present invention, this problem is overcome by the utilization of a collector plate 22 positioned transversely of the tank 10 at the upper end of the heating chamber and immediately below the cooling head 15. The plate 22 is circular in outline and secured to the inner wall of the tank 10 so as to form a partition thereacross. A cylindrical sump 23 of relatively shallow dimensions is provided in the central portion of the plate 22 and has an outlet pipe 24 depending therefrom, said pipe communicating at its upper end with the bottom of the sump 23, and having its lower end projecting below the oil-water interface normally present within the heating chamber of the tank. A plurality of risers 25 in the form of relatively short nipples, extend upwardly from the peripheral portion of the plate 22 and communicate between the upper and lower sides thereof. As illustrated in Fig. 1 of the drawings, the projection of the risers 25 a short distance above the upper surface of the plate 22 permits liquid to collect on said plate and prevents it from again flowing downwardly through said risers.

In the operation of this structure and method, the emulsion stream is introduced into the heating chamber B of the tank through the flume 18 as previously described. The emulsion fluids pass upwardly over the tube 21 and through the body of hot salt water in the lower portion of the tank whereby the emulsion is heated and placed in a condition for ready stratification. As such separation and stratification takes place, the water contained in the emulsion fluids settles to the lower portion of the tank while the clean oil rises to the upper portion of the tank and forms a clean oil layer C immediately below the plate 22. A suitable outlet 26 is provided for drawing off such oil as it accumulates but placed sufficiently high in the tank to maintain at all times a considerable layer or body of oil upon the body of salt water. There is normally an interface D between the layers of salt water and oil, and it is near or below this interface that the lower end of the pipe 24 extends. Up to this point, the operation of this treater and treating method is subsantially identical to previously employed systems.

It is in the handling of the vaporized components that the advantages of this invention reside. As previously pointed out, quantities of light hydrocarbons and water will be vaporized in the lower portion or heating zone of the heating chamber B. And, it is to be noted that as additional heat is required for treating the more difficult emulsions correspondingly larger quantities of components will be vaporized. These vapors pass upward through both the oil and water layers, and are often not condensed in either layer. Upon reaching the upper surface of the oil layer C, the vapors are caused to pass upwardly through the risers 25 into contact with the cooling head 15. At this point, the vapors, both hydrocarbon and water, are condensed upon the underside said head and fall downwardly therefrom in drops onto the upper surface of the plate 22. As the condensed fluids accumulate upon the upper surface of the plate, they flow into the sump 23 and thence are directed through pipe 24 to a point below the oil outlet 26. It is pointed out that these condensed liquids are not in an emulsified state, but rather exist as separate and relatively large globules or bodies of water or oil. Therefore, when the condensed liquids are conducted to a point below the oil outlet, they immediately separate with the oil globules passing upwardly into the oil layer and the water globules passing downwardly into the water layer. With this structure, substantially all water is removed from the clean oil and is prevented from again commingling with the clean oil so that a very clean and desirable product is obtained. Obviously, the structure and method is applicable to any type of emulsion treater using a condensing surface for the recovery of vaporized light hydrocarbons, and will materially increase the efficiency and desirability of any such treater or treating method.

The usual treater structures are employed herein, a gas equalizing pipe 27 being positioned in the chamber A and extending downwardly through the head 15 in to the heating chamber B of the tank. Also, a suitable water leg 28 is provided for removing separated salt water from the tank in accordance with the rate at which said salt water is introduced, while at the same time maintaining a predetermined salt water level in the treater. Equalizing gas connections 29 are made between the tank and the water leg.

In Fig. 3 is illustrated a modified form of the risers 25. In this modification, the risers 30 follow the structure of bubble caps as employed in ordinary fractionation towers, and carry a hood or cap 31 which prevents condensed liquids from dropping or falling from the cooling head 15 downwardly through said risers and directly into the body of clean oil therebelow. The caps thus serve to require all of the condensed liquid to flow onto the plate 22 and into the sump 23, and thence through the pipe 24 to a point at which the water and the oil may be separated and contamination of the clean oil is thereby avoided. Obviously, because of the downwardly concave curvature of the head 15, the majority of the condensed liquids will collect and drop from the center portion of the said head directly into the sump 23. However, a slight percentage of such condensed liquids might by chance fall downwardly through the vertical passages of the risers 25, and this problem is taken care of by utilization of the risers 30 with their covers 31.

In Figs. 4 through 7 is shown in modification of this method and structure for treating emulsion streams. This modified form employs a tank 40, similar to the tank 10, and having a domed top 41 with a gas outlet 42 therein. The tank is provided with a dished bottom 43 and is carried upon a suitable support 44. A transverse partition 45 is positioned interiorly of the tank adjacent the upper end thereof so as to define a preliminary separation chamber E.

The emulsion stream enters the chamber E through an inlet pipe 46 and flows from the chamber through a vertical flume 47 extending vertically downwardly through the body of the tank 40 from the chamber E to a point adjacent the lower end of the tank. The upper end of the flume 47 may or may not project upwardly a short distance into the chamber E so as to maintain a liquid level therein, since the influent emulsion stream will undergo its preliminary separation step without the accumulation of a body of the emulsion liquid in said chamber, and since cooling of the partition 45 will occur by reason of the emulsion stream flowing thereover.

At the lower end of the tank 40, the emulsion stream is directed from the flume 47 and through a branch pipe 48 to a spreader unit 49 similar in all material respects to the spreader 19, and being provided with a plurality of upwardly directed openings 50. A heater tube 51 is positioned in the tank 40 above the spreader 49 in the path of the emulsion stream passing upwardly through the openings 50, and also serves to heat the body of salt water F normally present in the lower portion of emulsion treaters.

Above the heater 51, a hood 52 is provided, said hood including a transverse partition 53 extending partially across the interior of the tank and carrying a depending skirt or lip 54 upon its outer edge which terminates short of the opposite side wall of said tank. The space thus provided between the edge of the partition 53 and the side wall of the tank is traversed by the flume 47 which passes downwardly therethrough. A transverse baffle 54' extends across the tank parallel to the skirt or lip 54 and spaced a short distance therefrom beneath the partition 53. The upper edge of the baffle terminates short of the underside of the partition to form an elongate narrow flow space through which the petroleum products in the upper portion of the hood 52 may flow. These products flow downwardly between the baffle and the skirt 54, and then upwardly around the lower edge of the skirt into the upper portion of the treater. The lower edge of the baffle extends below the lower edge of the skirt to prevent this upward flow from returning to the interior of the hood.

As previously pointed out, it is almost always the case in emulsion treaters that portions of the lighter hydrocarbons, and the water contained in the emulsion being treated will be vaporized by contact with the heater 51. The hood 52 serves to trap such vapors as they rise from the heater, and a vertical conductor 55 extends upwardly from the hood for conducting said collected vapors to a point adjacent the underside of the cooling partition or head 45. In this manner, the ascending vapors with their inherent turbulence and agitation, are removed from contact with the balance of the emulsion stream almost as soon as said vapors are evolved, so that the quiescent state desirable for efficient separation and stratification of the emulsion components is not disturbed, and such stratification is encouraged rather than being hindered through the introduction of undue turbulence. Upon contacting the cooling head, the vapors are condensed and disposed of, as to be described more fully hereinafter.

At the same time the hood 52 is functioning to direct the flow of the evolved vapors into the desired path, it also functions to collect the liquid portions of the emulsion stream and aid in their separation into oil and water components. The hydrocarbon portions of the stream will naturally gravitate to the upper portion of the hood, and thus will preferentially flow over the upper edge of the baffle 54' so that the latter functions as a dam or weir plate. The watery portions of the emulsion stream will be retarded to some extent by this preferential withdrawal from the upper portion of the hood, and will thereby be subjected to increased heating within the lower portion of the treater. Eventually, all portions of the emulsion stream will pass upwardly from the zone of the hood 52 except such water as may separate completely and settle to the lower end of the treater.

It is often desirable in an emulsion treater to include a so-called "hay" section in the upper portion of the heating zone F. Such a section includes an upper transverse plate 56 and a lower transverse plate 57 with a quantity of excelsior or hay or other suitable material 58 confined therebetween. The lower plate 57 carries a plurality of perforations or openings 59 in that half which overlies the hood 52, while the upper plate 56 carries a plurality of similar openings 60 in its opposite half. Thus, the emulsion fluids flowing upwardly from the hood 53, by passing under the skirt 54, are caused to flow transversely across the interior of the tank 40 before entering into the openings 59. Also, while passing upwardly through the hay section the fluids are again caused to flow transversely across the tank before exiting from the openings 60. In this manner, the flow path of the emulsion stream is considerably elongated.

The hay section functions in the usual manner to aid in the separation of the oil and water components of the emulsion, and to facilitate the agglomeration of minute particles of water or oil which may have separated. The emulsion is heated in the lower portion of the tank and then washed as it passes upwardly through the body of hot salt water F. By the time the fluids have reached the lower portion of the hay section, the separation process is substantially complete and the fluids have commenced to agglomerate and settle or rise to their respective levels.

For the purpose of condensing whatever portions of the emulsion stream may have been vaporized, the previously recited structure including the pipe 55 is employed to conduct said vapors into intimate contact with the underside of the relatively cool partition 45. As the vapors contact this partition they are condensed and will fall from the surface of the partition.

For collecting the condensed liquids, a cylindrical box 61 depends from the underside of the partition 45. As shown in Fig. 5, the box 61 is positioned eccentrically with respect to the tank 40 so as to permit adequate clearance for the downwardly extending flume 47. The box carries a plurality of radial ports or openings 62 near its upper edge which permit the egress of uncondensed gas and equalization of gas pressure between the box and the portion of the tank immediately below the partition 45. That part of the fluids passing upwardly to the box and which are not condensed, may pass upwardly into the chamber E by means of a riser pipe 63 extending vertically through the partition 45 and communicating between the chamber E and the interior of the box 61.

The condensed liquids accumulate in the bottom of the box and are conducted downwardly through a drain pipe 64 extending from the bottom of the box 61 to a point below the lower partition 59. In this manner, condensed hydrocarbons and water are directed into the intermediate portion of the stratification section of the tank, at which point they may separate and rise or sink to their respective levels. It is to be pointed out that this condensation and separation of the condensed liquids from the clean oil produced by the treater prevents the contamination of such oil by the condensed water. Of course, the condensed hydrocarbons eventually find their way into the oil level and are recovered therewith while increasing the gravity of the oil produced.

The tank 40 carries a clean oil outlet 65 at a point immediately below the partition 45, and is also provided with a water siphon structure 66 which draws separated water from the lower portion of the tank and exhausts the same while maintaining a constant water level within the interior of said tank. The usual gas pressure equalization connection 67 is made between the siphon structure 66 and the body of the tank immediately below the partition 45.

The operation of this structure and method is believed to be clear from the description given hereinbefore. However, it is to be pointed out that this method is particularly adaptable to emulsions which are difficult to break and which require higher treating temperatures. In the course of employing such higher temperatures, it is obvious that additional and larger quantities of water will be vaporized as the emulsion stream passes over the heater 51. The vaporized water must be kept separate from the clean oil which is being produced if the water content of such oil is to be maintained at the desired minimum. The method and structure described accomplish this desirable result by conducting the vaporized fluids directly to the condensing surface without permitting the same to pass through those portions of the emulsion stream which are nearing completed treatment. Thus, water is prevented from condensing at any point in the clean oil layer so that contamination of said oil is minimized. The condensed water and hydrocarbon vapors are conducted as liquid to a point well down in the treater tank and are given an adequate and ample opportunity to segregate into their relative layers in the course of flowing through the tank.

The second modification has an advantage in some instances over the first form described in that the possibility of condensation of the vaporized fluids while passing upwardly through the clean oil layer is eliminated. It is to be pointed out that this feature may also be incorporated into the first form described so that a structure is had in which the collecting plate and sump extend entirely across the treater tank so as to preclude any possibility of condensed liquids returning directly to the clean oil layer, while at the same time precluding the likelihood of any condensation of undesired fluids occurring within said oil layer.

In Fig. 8 of the drawings is illustrated a modified structure for carrying out this method preventing contamination of the clean oil produced from emulsions by any water which may have been vaporized in the treating process. This particular structure is most often used where the hay section of the treater is situated adjacent the underside of the preliminary separation chamber bottom. The tank 68 carries a hay section 69, the upper portion of which is confined by a transverse plate or partition 70. The partition 70 is spaced a relatively short distance below the dished plate 71 which forms the bottom of the preliminary separation chamber G and the upper end or wall of the washing chamber H. A gas equalization pipe 72 extends upwardly through the plate 71, while a flume 73 extends downwardly therethrough for conducting the emulsion stream from the preliminary separation chamber G to the lower portion of the washing chamber H.

The right-hand portion of the partition 70 is provided with a plurality of relatively small openings 74 through which the clean oil passes following separation and stratification in the chamber H. A relatively flat and thin box 75 overlies the openings 74 and is provided with a closed top 76. A weir box 77 is carried upon the top 76 of the box 75, the upper end of the weir box 77 being open and positioned immediately adjacent the underside of the plate or head 71. A short vertical partition 78 is provided in the central portion of the box 77 and serves to divide the lower portion of said box into two substantially equal sections. An opening 79 is cut in the plate 76 immediately beneath the right-hand section of the weir box so that clean oil produced may flow upwardly into the weir box and spill over the vertical partition 78. An oil outlet pipe 80 extends from the left-hand section of the box at a point below the upper edge of the partition 78 and conducts the clean oil, as it spills over the partition, from the tank to a suitable outside point of disposal or storage.

Since the upper end of the weir box 77 is open, any vapors which may have been evolved in the heating section of the treater tank may pass upwardly from the hay section 69, through the boxes 75 and 77, into contact with the underside of the dished head 71. A large proportion of the vapors will be condensed upon said head because of its relatively low temperature, maintained by the body of liquid within the separation chamber G as set forth hereinbefore. The condensed vapors, in the form of liquid, will fall from the head 71 onto the upper side of the partition or plate 70, and will flow downwardly therefrom through a suitable drain pipe 81 which extends from said plate to a point near or below the oil-water interface within said washing chamber H. Thus, the condensed water is held from returning to the clean oil and contaminating the same. At the same time, the clean oil is removed through the oil outlet pipe 80 very shortly after reaching the upper portion of the treater tank, and no large expanse of clean oil, into which condensed water may drop, is exposed at said upper end of the tank or washing chamber. The uncondensed vapors or gases may pass off through the riser 72, or they may be withdrawn through a suitable gas outlet 82 communicating with the uppermost portion of the washing chamber H. If desired, a vent cap 77' may be provided for the upper end of the weir box 77 similarly to the caps 31 provided in the form of the invention shown in Fig. 3. This cap will prevent condensed liquids from falling into the clean oil within the weir box.

It is to be noted, that in this modification the oil outlet 80 is at a higher elevation than the partition 70 upon which the condensate is collected.

A further modification is illustrated in Fig. 9 of the drawings, this form of the invention being similar in many respects to that illustrated in Fig. 1. For the purposes of simplicity, similar elements in this modification have been identified by the same numerals as like elements in the first form described. However, the principal difference between the two forms resides in the structure of the condensate collecting means. In the modified form, the plate 22 and sump 23 are replaced with a pan 83 having the shape of a relatively flat or wide angle cone. The pan 83 is disposed immediately below the upper partition 15 which forms the condensing surface for the vapors being evolved, and catches the condensate falling from said partition. The pan is provided with upstanding marginal lip 84, and its overall outside diameter is slightly less than the inside diameter of the tank 10 so that an annular space, indicated by the numeral 85, is provided between the periphery of the pan and the inside wall of the tank. Evolved vapors may pass upwardly through the space 85 so as to come into contact with the relatively cool partition 15 and condense thereon. Following such condensation, the liquids drop from the plate or partition 15 into the pan 83, and are conducted downwardly therefrom through a drain pipe 86 to a point within the lower portion of the washing chamber C, and preferably below the oil water interface D normally existing therein.

As previously pointed out, the condensed emulsion components do not again emulsify after dropping from the relatively cool condensing head or partition 15. For this reason, the components readily stratify upon reaching the pan 83, and the oil layer may be skimmed from the upper portion of the pan, if so desired. To accomplish this result, a short overflow pipe 87 may be provided within the pan so as to have its open upper end positioned a short distance below the upper edge of the marginal lip 84. With this structure, the oil layer which collects upon the upper portion of the body of liquids within the pan may overflow through the pipe 87 and pass directly to the clean oil layer C and be drawn from the tank to the oil outlet 26 without being required to pass downwardly through the drain pipe 86. To permit such a skimming action, it may at times be desirable to employ a simple float controlled valve (not shown) in order to control the removal of liquids from the pan by means of the pipe 86.

A further modification of the invention is illustrated in Figs. 10 through 16, wherein, the numeral 110 designates an upright cylindrical tank having the usual domed top 111 and dished bottom 112. The tank is carried upon a suitable support 113 of any desirable type.

A circular, transverse partition 114 is secured by its marginal, upturned flange 115 to the inner wall of the tank so as to extend transversely thereof, said partition being positioned a short distance below the top 111 so as to form a preliminary separation chamber A' in the upper portion of the tank 110. The emulsion stream enters the lower end of a suitable conductor 116 extending vertically and exteriorly of the tank, and flows upwardly therethrough to an inlet 117 provided in one side wall of the chamber A'. Upon entering the chamber, the emulsion stream is spread over a large area of the side wall of said chamber by means of a suitable diverter 118 secured upon the inner wall of the chamber so as to overlie the inlet 117.

A preheater jacket 119 surrounds the vertical conductor 116, as will be described more fully hereinafter, whereby the influent emulsion stream is preheated before entering into the chamber A'. Thus, upon being spread over the wall area of said chamber in a preheated condition, and by having its velocity reduced upon introduction into said chamber, the emulsion stream is given an opportunity to settle out large quantities of free or loosely bound water.

The partially stratified emulsion stream settled upon the partition 114 and serves to maintain said partition at the temperature of the incoming emulsion stream. The usual gas scrubbing chamber 120 is positioned in the upper portion of the chamber A', and a gas outlet 121 extends through the domed top 111 from the gas scrubbing chamber.

A flume 122 extends downwardly through the body of the tank 110 and near one side wall thereof from the partition 114 to the lower portion of the tank. As will be pointed out more fully hereinafter, the emulsion fluids collect upon the partition 114 and provide a relatively cool layer of fluid thereon. In accordance with the rate of flow into the chamber A', the fluids are conducted downwardly through the flume into the lower portion of the tank whereby the withdrawal of the fluids is proportioned to the introduction thereof into the chamber A' and the layer of relatively cool fluid on the partition 114 is maintained at all times.

The downwardly conducted emulsion fluids are admitted via the flume to the upper end of a preheater housing 123 provided in the lower portion of the treater tank. The housing 123 includes a transverse horizontal partition 124 extending across the tank near its lower end and beneath which the emulsion fluids are first introduced. As shown in Fig. 10, the partition 124 projects only half way across the tank from the flume 122 whereby the free or exposed edge of said partition is disposed substantially diametrically of the tank. The housing is completed by a depending skirt or lip 125 carried by said free edge of the plate 124. Thus, an open-bottomed preheater or settling chamber, which will be designated by the letter B', is provided, said preheating chamber being large in cross-sectional area and presenting a considerable wall area to the fluids within the body of the tank 110. It is to be noted that the chamber B' beneath the plate 124 may be of any desired depth since the tank dimensions and the spacing of the plate from the bottom thereof may readily be varied.

As is customary in emulsion treaters, the major portion of the tank body is employed as a heating chamber in which the emulsion is heated to separate and stratify the components thereof whereby the same may be drawn off as uncontaminated liquids. By presenting its relatively large wall area to this body of heated fluid, the preheater chamber B' acts as a heat exchanger to draw heat from said body of fluids and thereby raise to a considerable degree the temperature of the emulsion fluid entering said chamber through the flume 122. In this manner, additional separation and stratification of free water is accomplished with the chamber B', and most important, the emulsion fluids are heated whereby their viscosity is decreased. At the same time, said fluids are conducted into a relatively large and quiescent area or zone. As a result of the lowering of the viscosity and the reduced rate of flow of the emulsion stream, sand and other solids entrained or suspended in the emulsion stream are given an adequate opportunity to settle out of said stream and collect upon the dished bottom 112 of the tank. It is to be noted that all water removed at this point has been only moderately heated and has not reached the temperatures existent in the heating chamber of the treater. Thus, not all of the emulsion stream is fully heated, and the fuel consumption of the treater is reduced and minimized.

It has been found that the most difficult sand to settle out is that carried by the oil in the emulsion. Since the viscosity of the oil changes move rapidly with increasing temperature than does the viscosity of water, the principal effect of the heat applied in reducing the viscosity of the emulsion fluids is directed toward the reducing of the oil viscosity to permit the settling of the sand carried therein. Thus by the preheating steps recited, the emulsion is placed in a more favorable condition for settling out the sand, and such takes place in the chamber B'.

A transverse, vertical, skimmer baffle 126 is positioned within the lower portion of the chamber B' adjacent and parallel to the skirt 125. The upper edge of the baffle 126 is positioned above the lower edge of the skirt 125 and is adjacent the under side of the plate or partition 124. The baffle 126 thus acts to skim off the upper portion of the fluid present within the chamber B', such fluid flowing over the baffle 126 and under the skirt or baffle 125 and thence upwardly into the main body of the tank 110. The two baffles act in this manner to effect partial separation of free water from the water and oil yet emulsified so that the fluids passing upwardly into the main portion of the tank body are constituted to a large extent by that portion of the emulsion which is extremely difficult to separate or break. These upwardly flowing fluids may yet contain some entrained solid matter such as sand, and provision has been made for additional settling of this foreign matter carried over from the chamber B'.

A suitable heating unit or element 127, which may be steam coils or a gas-fired heater or any other suitable type of heating element, is positioned within the tank adjacent the upper portion of the chamber B' and immediately above the vertical baffle 125 so as to be substantially centered within the tank. As pointed out hereinbefore, the main body of the tank is occupied largely by heated water, usually salt water, or other heated fluid and due to the well known laws of thermal convection currents, this fluid is caused to flow upwardly around the heating element 127 and downwardly in the spaces between said element and the side walls of the tank. Thereby the fluid passing from the chamber B' to the heating area of the tank is delayed and slowed down and held in the heating zone for some time while flowing with the convection currents or circuits so that additional settling time and opportunity is given to any sand or other solids which may be carried by these upwardly flowing fluids. Indeed, some degree of settling is effected throughout this main portion of the tank body, the settled matter collecting upon the partition 124 and the bottom of the tank.

Due to this construction, the emulsion fluids are retained within this heating area a considerable period of time and are thoroughly heated therein. After such heating, the fluids are in condition to undergo stratification readily and to separate into their respective components, such step being completed in the upper portion of the tank as will be described hereinafter.

It has been found that certain emulsions, being more difficult to break or separate than other emulsions, require heating to higher temperatures for the carrying out of proper separation. This treater and method is particularly advantageous when used for treating such emulsions. As mentioned hereinbefore, certain undesirable results are characteristic of these high temperature treating methods. Obviously, larger portions of the emulsion stream are volatilized with the consequent possibility of loss through the gas outlet of the treater. In addition, as the treating temperature approaches the boiling point of water, increasingly larger quantities of water will be vaporized and will course upwardly to that portion of the tank from which the clean oil is removed. In many treaters, this water condenses in the upper portion of the tank and is carried off with the clean oil resulting in contamination thereof. Provision has been made herein for eliminating this undesirable result.

A transverse, horizontal partition 128 is provided above the heater element 127 and extends entirely across the tank. The flume 122 passes downwardly through said partition. The partition carries a depending circular or cylindrical baffle 129 near one lateral edge adjacent the flume 122, the baffle being vertically disposed. A vertical, cylindrical skirt or skimmer 130, is disposed concentrically within the baffle 129 and has its upper end projecting through the partition 128 while its lower end terminates above this lower end of the baffle. The fluids moving upwardly from the heater element are trapped by the partition 128 and 130 and pass through radial openings 131 cut in the upper end of the baffle 129 into the annular space between the skirt and the baffle. The fluids then pass under the lower edge of the skimmer and upwardly through the latter and through the partition 128. It is noted that the effective portion of the baffle 129 is its lower imperforate portion, and that the upper parts of the member between the openings 131 serve simply as means for supporting the baffle 129 from the partition 128. Hence, although the baffle 129 depends from and is carried by the partition 128, it also is spaced therebelow.

The partition 128 thus provides a gathering and holding zone for the highly heated fluids passing upwardly from the heating area or zone therebelow and circulating by convection within the heating zone. In this manner, the fluids are given an additional opportunity to separate and stratify, whereby additional quantities of water may coalesce and separate from the emulsion stream and pass downwardly into the main body of heated water adjacent the heater element 127. The as yet unbroken emulsion will rise to the top of the fluid trapped beneath the partition 128, and pass through the openings 131 and under the skimmer 130 so as to move upwardly into the upper portion of the tank. It is pointed out that these fluids are very highly heated and thus effect a considerable degree of preheating of the fluids passing downwardly through the flume 122 since they pass directly over said flume and are in a path or flow passage of relatively small area contiguous to said flume.

It is further noted that the emulsion containing the highest percentage of oil, that is the emulsion most nearly broken, will be the lightest and will preferentially seek the uppermost stratum in the heating zone immediately beneath the partition 128. Since the skimmer 130 draws fluid from the upper most portion of the heating zone, it will draw off first the emulsion and fluids of highest oil content. Thus, these fluids are quickly withdrawn and do not pick up unnecessary degrees of heat, while the more difficult portions of the emulsion stream are retarded and their heating continued to encourage their breaking and separation into oil and water components.

A suitable hay or filter section 132 is confined between an upper partition 133 and the lower partition 128, the upper partition 133 being situated near the medial portion of the tank. The partition 133 extends entirely across the tank 10 and is provided with suitable openings 134 through which the upwardly traveling fluids may pass. The openings 134 in the upper partition or plate are positioned at the opposite side of the tank from the flume 129 and the skimmer 130, so that the upwardly coursing fluids which pass through said skimmer must then pass substantially horizontally and completely across the hay section before they move upwardly through said partition 133.

Following the customary mode of operation of emulsion treaters, the emulsion stream, having been sufficiently heated by the element 127, is permitted to settle and stratify in the relatively large and quiescent area or stratification chamber above the heating zone, said area being represented by the hay section 132 and those portions of the tank immediately thereabove. At the same time, the fluids are forced to follow an elongate path whereby the opportunity for settling and stratification is increased, and the fluids are also forced to pass through the hay section, which may be filled with wood excelsior or straw or any other suitable material, whereby the minute globules or drops of water and oil are given an ample opportunity to coalesce and agglomerate into drops of such magnitude of size as to permit the settling of the water to the lower portion of the tank and the ascent or floating of the oil to the upper portion of the tank. A foraminous or wire mesh box 135 overlies the upper end of the skimmer 130 to prevent the packing material within the hay section from passing through the latter.

The clean oil is removed from the uppermost portion of the stratification zone, immediately below the partition 114, and drawn off through a suitable skimmer box and outlet 136 from which it passes downwardly through the jacket 119 to preheat the emulsion stream entering through the conductor 116. Thus, the sensible heat of the clean oil is utilized to a considerable extent for preheating the incoming emulsion stream and aiding its partial or prelimnary separation within the chamber A'.

In the first portion of the description of this modification, reference was made to the maintaining of a layer or body of fluid upon the upper partition 114. Since the oil outlet 136 is immediately below said partition, a U-tube structure is had in the body of the tank and in the flume 122, both of which are filled with liquid or fluid. However, the tank is largely filled with water, usually salt, while the flume is filled with a lighter material, the emulsion stream. Therefore, the levels in the two legs of the U-tube are not equal, but the level in the flume leg is higher and in actual practice lies within the chamber A' so that a layer of liquid remains in the chamber at all times, even when there is no fluid passing through the treater.

As pointed out hereinbefore, considerable quantities of fluid are vaporized when high treating temperatures are employed. As a matter of fact, some degree of vaporization occurs in almost any emulsion treater wherein the emulsion fluids are heated to any appreciable extent. Thus, the problem of condensation of undesirable fluids in the area from which the desirable fluids are withdrawn occurs in many instances. To overcome this difficulty, the present invention employs a centrally disposed vapor vent pipe 137 extending axially of the tank 110 from the partition 128 to a point spaced immediately below the underside of the partition 114. This vent pipe 137 conducts the vapors evolved in the heating zone and trapped by the partition 128, upwardly into contact and intimate relation with the partition 114. As pointed out hereinbefore, the partition 114 is maintained at a relatively constant and a relatively low temperature by reason of the body of emulsion fluids maintained thereupon within the chamber A'. The partition 114 thus acts as a condensing surface whereupon the upwardly flowing vapors are cooled and condensed so that they may ultimately be recovered.

A pan 138 surrounds the upper end of the pipe 137 and carries an upstanding marginal wall 139 having its upper edge jointed to the under side of the partition 114 in an annulus adjacent the marginal edge of said partition. An opening 140 is provided in the bottom of the pan through which the vent 137 extends, the opening being somewhat larger than said vent. The pan 138 thus forms a condensing and collecting chamber C' into which the vapors are conducted by the vent 137 and of which the relatively cool partition 114 forms the upper wall. The condensed vapors thus fall into the pan and are prevented from admixing with the clean oil present in the upper portion of the tank exterior of said pan. A drain pipe 141 is connected into the opening 140 in the bottom of the pan and extends downwardly through the hay section 132 concentrically of and surrounding the vent pipe 137 to a point immediately above the partition 128. In this manner, the oil and water condensed and collected in the pan passes through the opening 140 and is conducted downwardly to a point below the normal water level of the treater. From this point the oil may pass upwardly while the water settles downwardly into the main portion of the tank. Thus, the water is prevented from contaminating the clean oil, while the condensed hydrocarbon vapors are ultimately blended with the clean oil thereby raising the gravity and enhancing the value thereof.

A suitable gas equalizer line or pipe 142 extends through the partition 114 to the upper portion of the chamber A'. For a similar purpose, a plurality of openings 143 are formed in the upper portion of the wall 139 to permit equalization of gas pressures within and without the chamber C' and the tank 110 above the oil level therein. The water separated in the hay section is drained therefrom through a discharge pipe 144 extending downwardly into the chamber B', the upper end of the pipe 144 being covered with a strainer box 144' similar to the box 135. For removing water from the tank proper in accordance with the rate at which it accumulates therein, a water outlet pipe 145 is connected into the lower portion of the tank at an elevation below the partition 124. A suitable diverter baffle 146 is provided on the inside of the tank above the water outlet to prevent sand settling from the heating zone from entering into said outlet. The pipe 145 extends upwardly and exteriorly of the tank within a siphon jacket 147 which has its upper end connected through a gas equalizer pipe 148 with the gas zone immediately above the oil level in the tank and partition 114. An opening or openings 149 are cut in the wall of the pipe 145 at a suitable elevation somewhat above the water level within the tank, the withdrawn water passing upwardly through the pipe 145 to said opening and thence into the jacket 147 and out through a suitable drain 150. The elevation of the opening 149 determines the water level within the tank and serves to maintain it at the desired point.

A sand drain pipe 151 extends horizontally and transversely of the base 113 and intersects the center portion of the dished bottom 112 in a tangential fashion. Thus, sand collected in the bottom of the tank may pass into the bore of the pipe 151 and be ejected therefrom by a suitable pressure nozzle 152 connected into one end of said pipe. Any suitable fluid under pressure such as steam or gas or high pressure water may be employed in the nozzle 152 for carrying settled foreign matter out of the pipe.

For the purpose of flushing the collected matter into the pipe 151, a pipe ring 153 is positioned in the bottom of the tank at the upper edge of the dished bottom 112. The pipe ring 153 carries a plurality of nozzles 154 directed inwardly and at an angle from said pipe ring as shown in Fig. 13. In a similar fashion, a high pressure fluid may be introduced into the ring 153 and directed through the nozzles 154 to wash or flush settled material from the surface of the bottom 112 into the bore of the pipe 151. An auxiliary pipe 155 extends transversely of the tank above the partition 124 and is provided with a plurality of laterally directed openings 156 for flushing or washing settled material from the upper surface of the partition into the lower portion of the tank.

This method, and the treater embodying one means for carrying out the same, has been described with particular reference to the treating of emulsion streams which are difficult to break or which contain large quantities of floating sand or other foreign matter. However, it is pointed out and stressed that the treater and the method are equally advantageous and desirable for the treating of ordinary emulsions. The high degrees of preheating achieved through the use of the preheater 119, the flume 122, and the preheating chamber B' result in the removal of large quantities of water before the emulsion reaches the heating zone proper. In addition, a considerable degree of separation is effected in the area of the partition 128 so that the final load upon the settling chamber, represented in part by the hay section 132, is restricted to a large extent to treatment of only the very tight portions of the emulsion stream. In this manner, the separation and stratification chamber or area may work or operate at peak efficiency and the production of very clean and water-free oil is insured.

At the same time, adequate provision is made for preventing contamination of the clean oil by condensed water which is a problem encountered in substantially any emulsion treater whether the treating temperatures employed are high or low. Even at treating temperatures of 110–120° F., some vaporization and consequent condensation of water occur. It is to be noted that such vapors as are evolved are immediately gathered and conducted from the main stream of fluid being treated and are only reintroduced after they have been cooled and condensed.

The delaying action in the heating chamber is important over and above its sand-settling results. The temporary retarding of the emulsion flow and the progress of the emulsion stream, causes it to be retained for a longer period of time in the heating zone whereby thorough and complete heating to the desired temperature is achieved. Obviously, more efficient and complete treating will flow from more efficient and complete heating.

When more difficult emulsions are encountered, higher temperatures may be used with assurance, since adequate provision is made for recovering and separating those fluids caused to be vaporized by the increased temperatures employed. The treater is thus extremely versatile in that it handles with a high degree of efficiency and satisfactory results the ordinary type of emulsion. The treater also handles equally well, emulsions which contain small or large quantities of sand and/or are difficult to treat and break so that high treating temperatures are required.

The sand removal is accomplished, not through settling alone, but through preheating of the emulsion stream to reduce its viscosity and its density, whereby the resistance offered to the downwardly passing sand is reduced and the relative difference in density of the sand and the emulsion stream is increased. Both of these factors act and cooperate to enhance the tendency of the sand to settle out and to increase the settling rate. The bulk of the sand is removed or settled in chamber B', with the remainder being removed in the heating zone by reason of the retarding action achieved therein. Once settled out, ample provision is made for removing the accumulated sand from the interior of the tank.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An emulsion treating apparatus including, a tank, an upper partition in the tank forming a preliminary separation chamber in the upper portion of the tank, a lower partition in the tank forming a settling chamber in the lower portion of the tank, means for admitting an emulsion stream into the separation chamber and flowing the stream over the partition to maintain the latter relatively cool, means for conducting the emulsion stream from the separation chamber to the settling chamber, a heating element in the tank above the settling chamber, means for passing the emulsion stream upwardly from the settling chamber to the heating element, said heating element being immersed in a body of heated liquid, a pan in the tank adjacent the underside of the upper partition, a clean oil outlet from the tank below the upper partition establishing a liquid level in the tank and a gas space above the clean oil outlet and below the upper partition, said pan having gas passages communicating with the gas space and said pan being exposed to the relatively cool underside of the upper partition whereby fluids entering the pan from the gas space may condense, means for conducting condensed fluids from the pan to a point in the tank below the oil outlet, and means for drawing off water from the tank.

2. An emulsion treating apparatus as set forth in claim 1, an intermediate partition in the tank above the heating element and below the pan, means for conducting the heated emulsion stream through the intermediate partition, and a vapor conductor leading from the intermediate partition to the interior of the pan for conducting vapors evolved by the heating element to the underside of the upper partition.

3. An emulsion treating apparatus as set forth in claim 1, an intermediate partition in the tank above the heating element and below the pan, means for conducting the heated emulsion stream through the intermediate partition, and a vapor conductor leading from the intermediate partition to the interior of the pan for conducting vapors evolved by the heating element to the underside of the upper partition, the vapor conductor extending interiorly of the means for conducting condensed fluids from the pan.

4. An emulsion treating apparatus as set forth in claim 1, a drain in the bottom of the tank, wash-down nozzles in the lower portion of the tank for washing sediment toward the drain, and means for supplying a washing fluid under pressure to said nozzles.

5. An emulsion treating apparatus including, a tank, an upper partition in the tank forming a preliminary separation chamber in the upper portion of the tank, a lower partition in the tank forming a settling chamber in the lower portion of the tank, means for admitting an emulsion stream into the separation chamber and flowing the stream over the upper partition to maintain the latter relatively cool, means for conducting the emulsion stream from the separation chamber to the settling chamber, an intermediate partition in the tank between the upper and lower partitions forming a heating chamber above the settling chamber and a stratification chamber below the preliminary separation chamber, a pan in the tank immediately below the upper partition at the upper portion of the stratification chamber, the lower partition terminating short of one wall of the tank to provide an opening through which the emulsion stream flows upwardly and the intermediate partition having an opening therein for passing the emulsion stream upwardly, baffles adjacent said openings and spaced below said lower and intermediate partitions whereby the uppermost strata of the emulsion stream immediately beneath said partitions are skimmed off and passed through said openings, skirts depending from the lower and intermediate partitions and positioned between the baffle and the openings, a heating element in the heating chamber, means for conducting condensed fluids from the pan to a point in the tank spaced a substantial distance below said pan, means for drawing off oil from the tank, and means for drawing off water from the tank.

6. An emulsion treater including, a tank, an upper partition in the tank forming a preliminary separation chamber in the upper portion of the latter, an emulsion stream inlet into said chamber for flowing the emulsion stream over the upper partition to maintain the latter relatively cool, a lower partition in the tank forming a settling chamber in the lower portion of the tank, means for conducting the emulsion stream from the separation chamber to the settling chamber, an intermediate partition in the tank between the upper and lower partitions defining a heating chamber above the settling chamber and a startification chamber below the preliminary separation chamber, a heating element in the heating chamber, means for conducting the emulsion stream upwardly from the settling chamber to the heating chamber and from the heating chamber to the stratification chamber, a pan in the tank adjacent the underside of the upper partition defining a condensing space exposed to the relatively cool underside of the upper partition, said condensing space being in communication with the startification chamber, means for conducting condensed fluids from the pan to a point in the tank spaced a substantial distance below the pan, a water outlet from the tank, and a clean oil outlet from the tank.

7. An emulsion treater as set forth in claim 6, and a vapor conductor leading from the intermediate partition to the condensing space.

8. An emulsion treater as set forth in claim 6, a drain in the bottom of the tank, wash-down nozzles in the lower portion of the tank for washing sediment toward the drain, and means for supplying a washing fluid under pressure to said nozzles.

9. An emulsion treating apparatus including, a tank, an upper partition in the tank forming a preliminary separation chamber in the upper portion of the tank, a lower partition in the tank forming a settling chamber in the lower portion of the tank, means for admitting an emulsion stream into the separation chamber, means for conducting the emulsion stream from the separation chamber to the settling chamber, a heating element in the tank above the settling chamber, means for passing the emulsion stream upwardly from the settling chamber to the heating element for heating the emulsion stream to separate the stream into water and clean oil layers, the tank being constructed to contain a body of heated liquid around the heating element, a member in the tank defining a condensing chamber having a wall in common with the preliminary separation chamber whereby said wall is maintained relatively cool by the emulsion stream admitted to the preliminary separation chamber, a clean oil outlet from the tank establishing a liquid level in the tank and a gas space above said liquid level, said gas space being exposed through the condensing chamber to the relatively cool wall of the condensing chamber whereby vapors rising from the clean oil may condense in the condensing chamber, means for conducting condensed fluids from the condensing chamber to a point in the tank below the oil outlet, and means for drawing off water from the tank.

10. The method of treating flowing emulsion streams from wells which includes, conducting the emulsion stream through a preliminary separation step, then conducting the emulsion stream into a heating zone, passing the heated emulsion into a settling zone wherein the emulsion separates and stratifies into water and clean oil layers, condensing vapors arising from the heated emulsion, collecting the condensed vapors apart from the emulsion stream and the clean oil layer, and returning the condensed vapors to the separation and stratification step without allowing them to come into direct contact with the clean oil layer, the step of condensing vapors being carried out by passing the vapors in indirect heat exchange with the emulsion stream prior to the heating of the emulsion stream.

11. The method of treating flowing emulsion streams from wells which includes, conducting the emulsion stream through a preliminary separation step, then conducting the emulsion stream into a heating zone, passing the heated emulsion into a stratification zone wherein the emulsion separates and stratifies into water and clean oil layers, condensing the vapors arising from the heated emulsion, collecting the condensed vapors apart from the emulsion stream and the clean oil layer, separating water from the condensed vapors, returning the water to a point removed from the upper portion of the clean oil layer, and recovering the balance of the condensed vapors, the emulsion stream being passed in indirect heat exchange with the vapors arising from the heated emulsion to carry out the step of condensing said vapors.

12. In a method of treating flowing emulsion streams from wells by conducting the emulsion stream through a preliminary separation step then heating the emulsion and stratifying it into oil and water layers while condensing vaporized fractions by passing said fractions in heat exchange relationship with the emulsion stream passing through the preliminary separation step, the improvement which includes, collecting the condensed fractions apart from the emulsion stream and the oil layer, separating water therefrom, and conducting the balance to the oil layer, the emulsion stream being passed in contact with a partition in the preliminary separation step, and the vapors being condensed by direct contact with the latter partition.

13. In a method of treating flowing emulsion streams from wells by conducting the emulsion stream through a preliminary separation step then heating the emulsion and stratifying it into oil and water layers while condensing vaporized fractions by passing said fractions in heat exchange relationship with the emulsion stream passing through the preliminary separation step, the improvement which includes, collecting the condensed fractions and holding them apart from the emulsion stream and the oil layer, stratifying the condensed fractions into oil and water strata, skimming off the oil stratum to the oil layer, and conducting the water stratum to a point removed from the upper protion of the oil layer, the emulsion stream being passed in contact with a partition in the preliminary separation step, and the vapors being condensed by direct contact with the latter partition.

14. In a method of treating flowing emulsion streams from wells by conducting the emulsion stream through a preliminary separation step then heating the emulsion and stratifying it into an upper oil and a lower water layer, the improvement which includes, collecting vaporized components from the emulsion stream following the heating and prior to the stratification of the latter, conducting the vaporized components separately from the emulsion stream and the oil and water layers in indirect heat exchange relationship with the emulsion stream passing through the preliminary separation step whereby said vaporized components are condensed, conducting the condensed components apart from the emulsion stream to a point removed from the upper portion of the oil layer, and stratifying the condensed components, the emulsion stream being passed in contact with a partition in the preliminary separation step, and the vapors being condensed by direct contact with the latter partition.

15. In a method of treating flowing emulsion streams from wells by conducting the emulsion stream through a preliminary separation step then heating the emulsion and stratifying it into an upper oil and a lower water layer, the improvement which includes, collecting vaporized components from the emulsion stream following the heating and prior to the stratification of the latter, conducting the vaporized components separately from the emulsion stream and the oil and water layers in indirect heat exchange relationship with the emulsion stream passing through the preliminary separation step whereby said vaporized components are condensed, collecting the condensed components, conducting the condensed components apart from the emulsion stream and separate from the oil and water layers to a point removed from the upper portion of the oil layer, and separating the condensed components, the emulsion stream being passed in contact with a partition in the preliminary separation step, and the vapors being condensed by direct contact with the latter partition.

16. An emulsion treater including, an upright tank having a relatively cool head at its upper end, means for conducting an emulsion stream over the head to cool the same, a heater in the lower part of the tank, an emulsion stream conductor leading to the heater, a transverse condensed vapor collecting pan in the tank immediately below the head, a clean oil outlet leading from the tank for maintaining in the tank a clean oil level below the head, a water outlet from the tank, and a conductor extending downwardly from the pan in the tank, the zone between the head and the pan being in direct communication with the body of the tank.

17. An emulsion treater as set forth in claim 16 wherein the pan carries ports for passing vaporized emulsion components from the tank to the head.

18. An emulsion treater as set forth in claim 16 wherein the pan carries bubble caps for passing vaporized emulsion components from the tank to the head.

19. An emulsion treater as set forth in claim 16 wherein the pan is non-planar, and the conductor extends from the lower portion thereof.

20. An emulsion treater including, a tank the upper end of which provides a relatively cool condensing surface, a heater in the tank below the upper end of the tank, an emulsion stream conductor for conducting an emulsion stream to the heater, means for permitting vapors evolved at the heater to pass upwardly to the condensing surface and condense, a pan within the tank positioned closely beneath the condensing surface and having its periphery spaced from the tank walls to provide a flow passage for upwardly passing vapors, means for skimming off the upper portion of the condensed vapors in the pan, a conductor extending downwardly in the tank for receiving condensed vapors from the pan, water and oil outlets from the tank, and means for conducting the emulsion stream over the condensing surface to cool the same.

21. An emulsion treater including, a tank having a preliminary separation chamber through which the emulsion stream is passed prior to final heating whereby the walls of the said chamber are maintained relatively cool, a heater in the tank below the preliminary separation chamber, means for conducting the emulsion stream to the heater after said stream has been passed through the preliminary separation chamber, means for passing vapors evolved at the heater upwardly into heat exchange relationship and direct contact with a wall of the preliminary separation chamber with which the emulsion stream passing through the preliminary separation chamber is flowing in thermal relationship and direct contact whereby said vapors are condensed, a condensed vapor collector in the tank below the latter wall of the preliminary separation chamber so that condensed vapors flow by gravity from the wall to the collector, and a conductor extending downwardly in the tank for receiving condensed vapors from the collector, the condensed vapor collector defining a condensation zone having in common with the preliminary separation chamber that wall in contact with which the heat evolved vapors are passed, and water and oil outlets from the tank.

References Cited in the file of this patent

UNITED STATES PATENTS

| | | |
|---|---|---|
| 1,585,632 | Isaac | May 18, 1926 |
| 1,789,612 | Walker | Jan. 20, 1931 |
| 2,167,703 | Holmes | July 11, 1939 |
| 2,167,160 | Raymond | July 25, 1939 |
| 2,297,297 | Walker | Sept. 29, 1942 |
| 2,384,222 | Walker | Sept. 4, 1945 |
| 2,474,475 | Glasgow | June 28, 1945 |
| 2,420,115 | Walker et al. | May 6, 1947 |
| 2,598,988 | Glasgow | June 3, 1952 |
| 2,614,649 | Walker et al. | Oct. 21, 1952 |